3,078,113
ANTI-FRICTION IDLER ARM ASSEMBLY
Theodore F. Carlson, 2711 S. Race St., Denver, Colo.
Filed Dec. 15, 1958, Ser. No. 780,429
1 Claim. (Cl. 287—93)

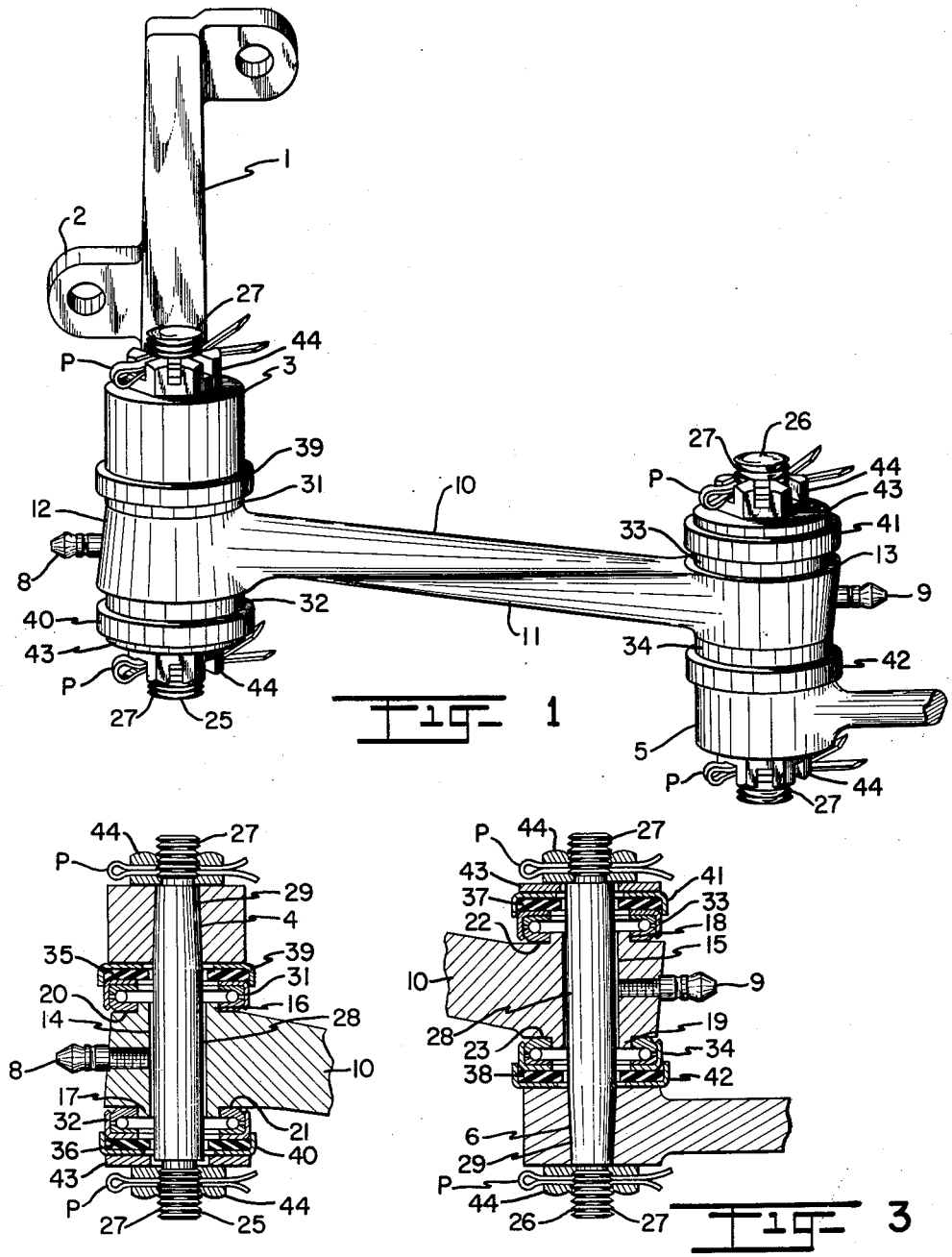

This invention relates to coupling means for relatively oscillating members and in particular to an improved steering gear anti-friction idler arm assembly of the general type illustrated in the Theodore F. Carlson U.S. Patents Nos. 2,689,756 and 2,809,049.

The steering mechanisms of practically all automobiles comprise a steering shaft controlled by the pilot through the medium of a steering wheel which carries at its lower end a crank arm. To the latter is connected a drag or cross link and the wheel mountings of the automobile are connected with the drag link by steering arms and tie rods. Since the steering shaft and crank arm are positioned adjacent the left side of the automobile, the right hand end of the drag link is supported by an idler arm provided by the automobile manufacturer. The idler arm is pivotally supported from the chassis frame at the right side of the automobile by a bracket also provided by the manufacturer to which the idler arm is operatively coupled through a pivotal assembly and, of course, in turn the right hand end of the drag link is connected for relative pivotal movement with the free end of the idler arm. It has been found that in time the pivotal connections or joints between the idler arm and bracket and the idler arm and drag link require replacement, due to the friction that develops which results in hard steering and other objectionable developments which not only affect the safety of the automobile, but the ease of car handling.

The present invention relates to an improved anti-friction idler arm assembly that may be substituted for idler arm and pivotal assemblies of the type mentioned and currently used in the 1958 Chevrolet automobile. More specifically, the complete assembly of this invention, when installed, eliminates hard steering, wear and noise, it changes the friction and wear to ball-bearing action, and it provides a permanent assembly with the weight of the drag link and bracket being on anti-friction ball-bearings and the road shock being absorbed at four spaced points by pre-loadable resilient means.

Thus it is the primary object of this invention to provide an improved anti-friction idler arm assembly having the advantages enumerated.

A further object is to provide an assembly of the type described incorporating an idler arm having spaced, tapered sockets for receiving tapered pins that are locked in position and together with anti-friction bearings are pre-loaded and maintained in such condition.

Another object is to provide an idler arm assembly as defined in the preceding paragraph having bearing races properly supported on the idler arm whereby the road shock is absorbed by four spaced points containing ball-bearings maintained in a pre-loaded condition.

Other objects and advantages of the invention will become apparent upon considering the following detailed description in conjunction with the drawing wherein the preferred embodiment is illustrated and wherein:

FIGURE 1 is a perspective view of the entire idler arm assembly of this invention including a supporting bracket and a portion of a drag link;

FIGURE 2 is an exploded view partly in section showing the pivotal connection between the idler arm and bracket; and FIGURE 3 is an exploded view partly in section of the pivotal connection between the idler arm and drag link.

Now referring to the drawings in detail, it should be mentioned that several of the elements of the assembly of this invention, namely the bearing assemblies, the resilient washers as well as the cups for containing the latter are quite similar to the corresponding elements of said Patents No. 2,809,049 and No. 2,689,756.

The bracket 1, supplied by the automobile manufacturer is adapted to be attached in the usual manner to the chassis of a motor vehicle and includes an attaching portion 2 and a portion 3 of substantial cylindrical shape having a tapered recess or socket 4, the socket decreasing in size from the bottom of portion 3 to the top thereof as viewed in FIGURE 2. The numeral 5 represents a portion of the drag link which likewise is supplied by the automobile manufacturer and has a tapered socket 6 extending centrally and vertically therethrough and decreasing in size from top to bottom as viewed in FIGURE 3. The idler arm supplied by the automobile manufacturer includes an elongated body that carries at each end pins or the like for attachment in the sockets 4 and 6 and in operation the idler arm is pivotally connected to the bracket and in turn there is a pivotal connection between the idler arm and drag link. The assembly of the present invention is to be substituted for this connection between the bracket and drag link to provide the advantages enumerated.

Essentially the assembly includes a machined idler arm 10 that is preferably drop forged from a suitable steel alloy and comprises an elongated solid portion 11 having at each end enlarged oppositely directed truncated cone portions 12 and 13, each provided with sockets or recesses 14 and 15 extending centrally and vertically therethrough. At the peripheries of and surrounding each end of each recess is an upstanding annular ring 16, 17, 18 and 19 which together with the flat top and bottom walls 20, 21, 22 and 23 of the portions 12 and 13 from four spaced bearing receiving shoulders. It should also be pointed out that portions 12 and 13 are provided with grease nipples or grease fittings 8 and 9 for supplying suitable lubrication to sockets 14 and 15 and the bearings to be described and this should be apparent.

Pins 25 and 26 are identical but located in reverse. Specifically, each pin includes threaded areas 27 adjacent the ends thereof, a solid cylindrical portion 28 adapted to be located in and extend through in journaled relationship recesses 14 and 15, and a solid, fairly substantially tapered area 29 for fitting within the tapered areas or sockets 4 and 6 of bracket portion 3 and link portion 5. Ball bearing or thrust bearing units are shown at 31, 32, 33 and 34 and may be of the type illustrated in said patents. Resilient washers or bushings are depicted at 35, 36, 37 and 38 and cup-shaped metal washers for containing the bushings are shown at 39, 40, 41 and 42. Additional flat metal washers are connoted at 43, suitable nut means at 44, and cotter pins P for passing through transverse slots provided in the threaded tips of the pins 25 and 26. Each ball bearing assembly preferably includes, as in Patent 2,809,049, upper and lower ball races held in place by suitable cup means and each resilient washer or bushing 39 to 42 is preferably made from synthetic rubber or rubber-like material such as Neoprene or Duprene which is not deleteriously affected by grease or oil. Furthermore, each bushing is preferably compressible whereby there may be preloading and maintaining of the parts in tension and any looseness that might develop as a result of wear will be compensated for by the expansion of the compressed bushings. In addition, the bushings function as grease seal means.

Let us assume that the pivotal connection between the bracket 1 and idler arm and the latter and the drag link 5 has deteriorated to the extent that replacement of the manufactured unit is required in order to have safe, reliable and easy steering. The automobile mechanic disassembles all but bracket 1 and then is prepared to install the overall assembly of this invention. Pin 25 is passed through socket 4 with tapered area 29 being positioned in the socket 4. Thereafter bearings 31 and 32 are positioned on the shoulder means formed by surfaces 20, 22, 16 and 17 and bushings 35 and 36 are positioned in their containing cups 39 and 40 as shown, the bearings, bushings and cups being axially movable on pin 25. Next the nuts 44 and pins P are applied to an extent sufficient to adequately compress bushings 35 and 36 whereby head 12 may rotate relative to and about pin 28 on preloaded ball bearing assemblies. This latter condition will be maintained due to the capability of bushings 35 and 36 to expand and also it will be clear that such results in other elements as pins 25 and 26 and the bearings being maintained under tension with respect to the idler arm. As should be apparent from FIGURE 3 the portion 5 of the drag link is similarly installed whereby portion 5 is in effect keyed to section 29 and there may be relative rotation of portion 13 and area 28 on ball bearings maintained in a pre-loaded state.

From the foregoing it should be clear that there has been invented an assembly having the advantages and objects outlined, such as those directed to pre-loading or maintaining the elements under tension at four spaced points, it being understood that the scope of the invention is to be limited only in accordance with the appended claim.

What is claimed is:

In a steering gear idler arm assembly, a coupling for interconnecting each end of an idler arm and a connecting member for relative pivotal movement therebetween, each connecting member having a tapered opening oppositely directed in relation to one another, the idler arm including an enlarged head portion at each end thereof with a cylindrical opening extending through each head portion in a direction normal to the idler arm, each coupling comprising a pin member having threaded areas at its opposite ends, said pin member further including a cylindrical portion for extension through the cylindrical opening in journaled relation to each head and an outwardly tapered surface portion defining a continuation of said cylindrical portion for extension in close fitting relation through the tapered opening in the connecting member, threaded locking means engageable with the locking areas at each end of said pin, the locking means adjacent the connecting member being disposed to hold the connecting member in rotative keyed relation to said pin and said locking means together limiting outward relative movement of the head and connecting member on said pin, and a pair of bearing assemblies including a first bearing assembly interposed in close-fitting relation between the head and the adjacent locking means and a second bearing assembly interposed in close-fitting relation between the head and the connecting member, each bearing assembly including a bearing unit supporting said head in journaled relation to said pin and the connecting member, and resilient compressible means bearing against each bearing unit and being preloaded under compression by said locking means to yieldingly maintain the head and the connecting member under tension.

References Cited in the file of this patent

UNITED STATES PATENTS

| | | |
|---|---|---|
| 1,899,645 | Sneed | Feb. 28, 1933 |
| 1,909,100 | Geyer | May 16, 1933 |
| 1,940,466 | Sneed | Dec. 19, 1933 |
| 1,942,182 | Moorhouse | Jan. 2, 1934 |
| 2,122,652 | Lautz et al. | July 5, 1938 |
| 2,502,925 | Case | Apr. 4, 1950 |
| 2,689,756 | Carlson | Sept. 21, 1954 |
| 2,809,049 | Carlson | Oct. 8, 1957 |
| 2,853,327 | Traugott | Sept. 23, 1958 |

FOREIGN PATENTS

| | | |
|---|---|---|
| 137,045 | Austria | Apr. 10, 1934 |
| 598,611 | Great Britain | Feb. 23, 1948 |
| 283,965 | Switzerland | Nov. 1, 1952 |

OTHER REFERENCES

Publication entitled Linkage Joints, by Ho Chow, vice-president, Westchester Technical Corp., December 8, 1958, issue of Produce Engineering published by McGraw-Hill Publishing Co., Inc.